G. H. RIEBETH.
BATTERY TESTER.
APPLICATION FILED MAY 28, 1919.

1,337,160. Patented Apr. 13, 1920.

Inventor:
George H. Riebeth,
by: J. S. Bradbury
Attorney.

UNITED STATES PATENT OFFICE.

GEORGE H. RIEBETH, OF MINNEAPOLIS, MINNESOTA.

BATTERY-TESTER.

1,337,160.          Specification of Letters Patent.          Patented Apr. 13, 1920.

Application filed May 28, 1919. Serial No. 300,338.

*To all whom it may concern:*

Be it known that I, GEORGE H. RIEBETH, a citizen of the United States, residing at Minneapolis, in the county of Hennepin and State of Minnesota, have invented a new and useful Battery-Tester, of which the following is a specification.

The primary object of this invention is the production of a simple, inexpensive and effective device that can be easily and quickly used by salesmen for testing dry batteries while they are contained in round or square cartons of the usual type, or removed therefrom, the testing of the batteries being for strength or amount of current. Pocket ammeters or voltmeters have been employed for this purpose but the use of these devices has necessitated connecting the terminals of the battery to the terminals of the pocket meter and this has required time and has been inconvenient. By the use of my invention the battery can be thrust into a receptacle and the connection made so that the amount or strength of the current can almost instantly be determined without carefully adjusting the terminals of the battery in contact with the terminals of the meter, or wiring the battery to the meter. By the use of my invention it is not necessary to remove the battery from the carton when making the test and the battery can without inconvenience, be tested quickly before it is sold, thus assuring the purchaser that the battery is of the proper strength and has not become partially or wholly exhausted.

Figure 2:
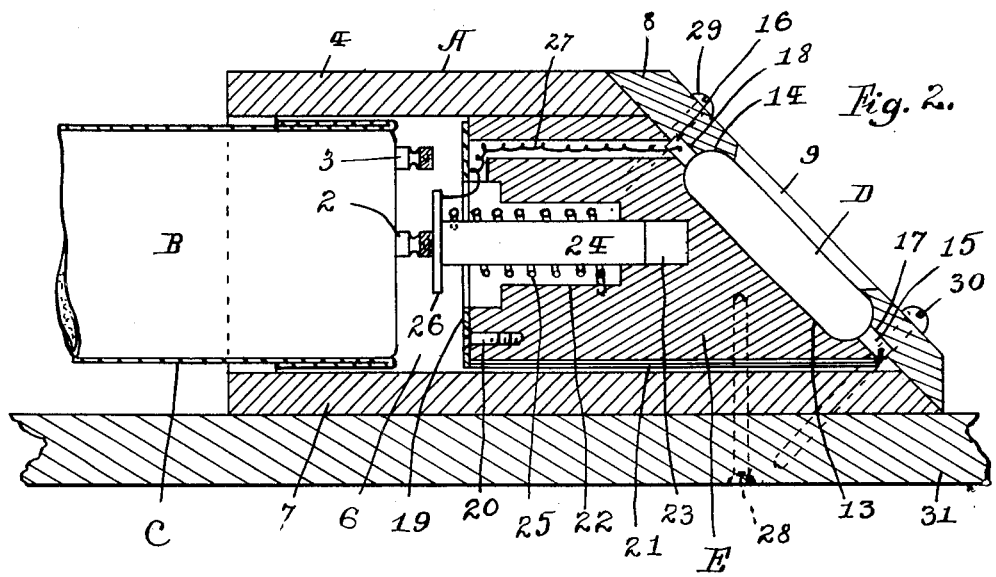
Figure 1:
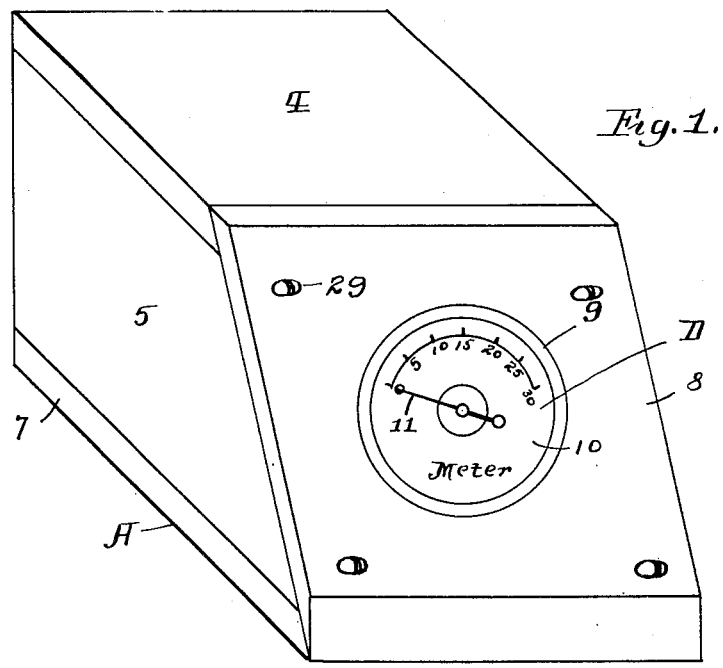

The invention is further so constructed that it can be easily attached to a counter or stationary object in a store convenient for instant use by salesmen. The invention further is so shaped and arranged that the dial of the meter can be read by persons standing near either end of the tester. With these features of advantage and objects in view, my invention comprises the features of construction and combination of parts hereinafter more particularly described and claimed. In the accompanying drawing forming part of this specification, Figure 1 is a perspective view of my invention, and Fig. 2 is a longitudinal vertical, central section of my invention showing a detail portion of a dry battery inserted therein to be tested and the carton of the battery in longitudinal section. In the drawing A indicates a receptacle which is open at one end and of proper dimensions to receive a tubular battery B, furnished with a round or square carton C, said battery having terminals 2 and 3 so arranged or adjusted as to conduct a current of electricity to the ammeter or voltmeter D to determine the condition of the battery being tested. The receptacle A in cross section is angular, being provided with four walls, 4, 5, 6, and 7, but it will be understood that its shape may be variously modified and curved when desired. It is so constructed that it can be attached to a counter or any stationary object in a store convenient for use by salesmen in selling dry batteries. The forward end of the receptacle opposite the end in which the battery is inserted is provided with a front wall 8 which is arranged at an angle slanting upwardly and rearwardly, and below and partly in said front wall is placed the meter D which may be of the usual pocket or other type of ammeter or voltmeter used for testing ordinary dry batteries. The front wall has an opening 9 through which the face 10 of the dial of the meter is exposed making it convenient for persons standing at either end of the tester, due to said angle of inclination, to see the dial and read the amount or strength of the current indicated by the pointer 11.

Arranged within the receptacle A is a block E. which is formed with a recess 13 corresponding with a recess 14 surrounding the opening 9 for holding the meter D. The meter D has a pair of the usual electrical terminals 15 and 16 and the block and cover are formed with openings 17 and 18 to receive the terminals. The block E has upon its inner face a ring plate 19, secured thereto by the fasteners 20 and electrically connected to the terminal piece 15 by the conductor 21. The inner end of the block is also formed with a centrally disposed circular opening 22, a portion 23 of which at its inner end being of less diameter than the outer portion. A shaft 24 is slidably supported in the inner portion 23 of said opening. A coil spring 25 placed freely around the shaft is adapted to urge the shaft outwardly. The inner end of the coil spring is secured to the outer wall of the opening 22 and the outer end is secured to the outer end of the shaft. The spring thus limits the outward movement of the shaft. The outer extremity of the shaft is provided with a head piece 26 which is electrically connected by the flexible conductor 27 with the terminal 16 of the meter. The block E is secured in the receptacle by the screw 28 or other suitable means and the cover 8 is secured to the block by the screws 29 and 30 or other suitable means. The lower-most screws 30 may also be employed to fasten the entire device on the counter 31 or other support.

In use a battery to be tested is thrust with its terminal end first into the receptacle, the terminal 3 contacting against the head piece 26 and sliding the shaft against the tension of spring 25 inwardly until the terminal 2 is pressed firmly against the plate 19, whereupon a circuit is completed from the battery to the meter. When thus adjusted in the meter receptacle the strength or amount of current produced by the battery will be indicated by the meter and any unevenness in height or length of the terminal pieces 2 and 3 on the battery will be compensated due to the resiliently supported contact member 26 and shaft 24. In use all that is required of the user is to open the top flap of the battery carton C and thrust the battery while remaining in its carton terminals first into the meter receptacle. When fully inserted good connection is always made without any further hand manipulation and in an automatic manner, thus saving time and work. Obviously the device can be used when the battery is removed from its carton as readily as when the battery is in its original package. The invention is extremely simple and inexpensive in construction and places in the hands of salesmen a device which saves time and expense in testing dry batteries as they are sold to customers.

Having described my invention, what I claim as new and desire to secure by Letters Patent, is:

1. A battery tester, comprising, in combination, a receptacle having an opening into which the terminal end of a battery may be plunged, a meter supported by said receptacle with its dial face exposed, and a set of terminals electrically connected with said meter and arranged in the path and with which the terminals of the battery will contact when the battery is inserted in the receptacle, one of the terminals of said set being yieldingly supported to compensate uneven length of the battery terminals.

2. A battery tester comprising, in combination, a receptacle open at one end and adapted to receive the terminal end of a battery therein, a meter for testing the battery supported by said receptacle and a pair of terminals leading from the meter and arranged in the receptacle with which the terminals of the battery are adapted to contact when the battery is inserted in the receptacle.

3. A battery tester comprising, in combination, a receptacle open at one end and adapted to receive the terminal end of a battery therein, a meter for testing the battery supported by said receptacle with its dial face exposed and inclined upwardly and rearwardly.

4. A battery tester comprising, in combination, a receptacle open at one end and adapted to receive the terminal end of a battery therein, a meter for testing the battery supported by said receptacle and a pair of terminals leading from the meter and arranged in the receptacle, one of said terminals being rigid and the other yieldingly supported in the path of the terminals of the battery to contact therewith when the battery is plunged into said receptacle, whereby electric connection, by the meter with terminals of uneven height on the battery, is automatically effected.

5. A battery tester comprising, in combination, a receptacle, a cover over one end of said receptacle having an open face, a block in said receptacle adjacent to said cover, a meter between said cover and block having its dial exposed through said open face of said cover, a contact terminal shaft slidably and yieldingly supported in the inner end of said block, a second terminal on said block adjoining said depressible terminal, said terminals being electrically connected with said meter and arranged in the path of the terminals of a battery when the latter is plunged terminal end first into said receptacle.

In testimony whereof I have signed my name to this specification.

GEORGE H. RIEBETH.